US012794279B2

(12) United States Patent
Suzuki

(10) Patent No.: US 12,794,279 B2

(45) Date of Patent: Nov. 10, 2026

(54) MOTOR, HARD DISK DRIVE DEVICE, BLOWER, AND METHOD FOR MANUFACTURING MOTOR

(71) Applicant: MINEBEA MITSUMI Inc., Kitasaku-gun (JP)

(72) Inventor: Akihiko Suzuki, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 190 days.

(21) Appl. No.: 18/809,638

(22) Filed: Aug. 20, 2024

(65) Prior Publication Data

US 2025/0070602 A1 Feb. 27, 2025

(30) Foreign Application Priority Data

Aug. 23, 2023 (JP) ................................ 2023-135478
Jun. 13, 2024 (JP) ................................ 2024-096031

(51) Int. Cl.

| | |
|---|---|
| ***H02K 1/04*** | (2006.01) |
| ***G11B 19/20*** | (2006.01) |
| ***H02K 7/14*** | (2006.01) |
| ***H02K 15/12*** | (2025.01) |

(52) U.S. Cl.

CPC .......... *H02K 1/04* (2013.01); *G11B 19/2009* (2013.01); *H02K 7/14* (2013.01); *H02K 15/12* (2013.01)

(58) Field of Classification Search

CPC ........... H02K 1/04; H02K 7/14; H02K 15/02; H02K 15/12; G11B 19/2009

See application file for complete search history.

(56) References Cited

U.S. PATENT DOCUMENTS

| | | | | |
|---|---|---|---|---|
| 11,283,309 | B2 * | 3/2022 | Tomiyama | H02K 15/095 |
| 2022/0068305 | A1 * | 3/2022 | Showa | G11B 25/043 |
| 2022/0130428 | A1 * | 4/2022 | Suzuki | G11B 33/02 |
| 2022/0262403 | A1 * | 8/2022 | Ito | B22D 17/00 |

FOREIGN PATENT DOCUMENTS

| | | | | |
|---|---|---|---|---|
| JP | H07118238 | B2 | * | 12/1995 |
| JP | 2000064094 | A | * | 2/2000 |
| JP | 2002294172 | A | * | 10/2002 |
| JP | 2005015863 | A | * | 1/2005 |
| JP | 2008-072900 | A | | 3/2008 |
| JP | 2018182904 | A | * | 11/2018 |

* cited by examiner

*Primary Examiner* — Jeremy A Luks

(74) *Attorney, Agent, or Firm* — Chrisman Gallo Tochtrop LLC

(57) ABSTRACT

A motor includes a stator core including a stacked body of electromagnetic steel plates, a surface of the stacked body is covered with a coating film, and the coating film is an epoxy resin-containing electrodeposition coating film subjected to overbaking.

5 Claims, 9 Drawing Sheets

MOTOR, HARD DISK DRIVE DEVICE, BLOWER, AND METHOD FOR MANUFACTURING MOTOR

CROSS-REFERENCE TO RELATED APPLICATIONS

This application claims the benefit of priority to Japanese Patent Application Numbers 2023-135478 and 2024-096031 filed on Aug. 23, 2023, and Jun. 13, 2024, respectively. The entire contents of each of the above-identified applications are hereby incorporated by reference.

TECHNICAL FIELD

The disclosure relates to a motor, a hard disk drive device, a blower, and a method for manufacturing a motor.

BACKGROUND

In a spindle motor as one type of motor, it is known that a surface of a stator core constituting the spindle motor is coated by electrodeposition with an insulating material (JP 2008-72900 A). The stator core includes a plurality of pole teeth (protruding poles) extending outward in a radial direction and disposed along a circumferential direction. A coil is wound around the pole teeth.

SUMMARY

In a process of winding the coil around the pole teeth of the stator core, pressure may be applied to the coil. As a result, the coil may be embedded into an electrodeposition coating film of the stator core.

An object of the disclosure is to provide a structure less likely for a coil to be embedded into an electrodeposition coating film of a stator core in a motor.

In order to solve the problem described above, there is provided a motor including a stator core including a stacked body of electromagnetic steel plates, a surface of the stacked body being covered with a coating film, wherein the coating film is an epoxy resin-containing electrodeposition coating film subjected to overbaking.

According to the disclosure, in the motor, a coil is less likely to be embedded into the electrodeposition coating film of the stator core.

DESCRIPTION OF EMBODIMENTS

Hereinafter, embodiments of the disclosure will be described with reference to the drawings. However, while various technically preferable limitations for carrying out the disclosure are attached to the embodiments to be described below, the scope of the disclosure is not limited to the following embodiments and illustrated examples.

First Embodiment

Figure 1:
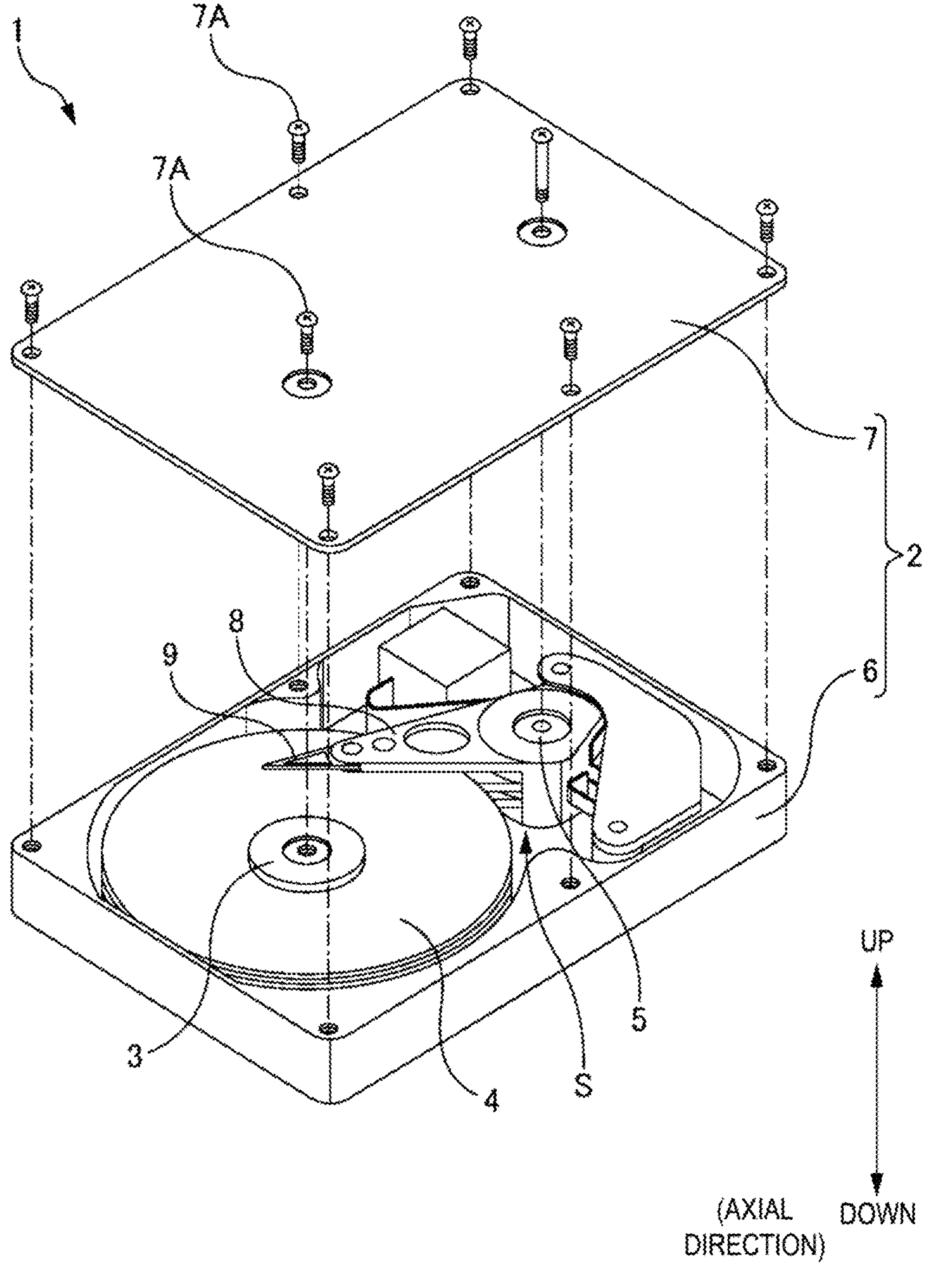
FIG. 1 is a perspective view of a hard disk drive device 1.
Figure 2:
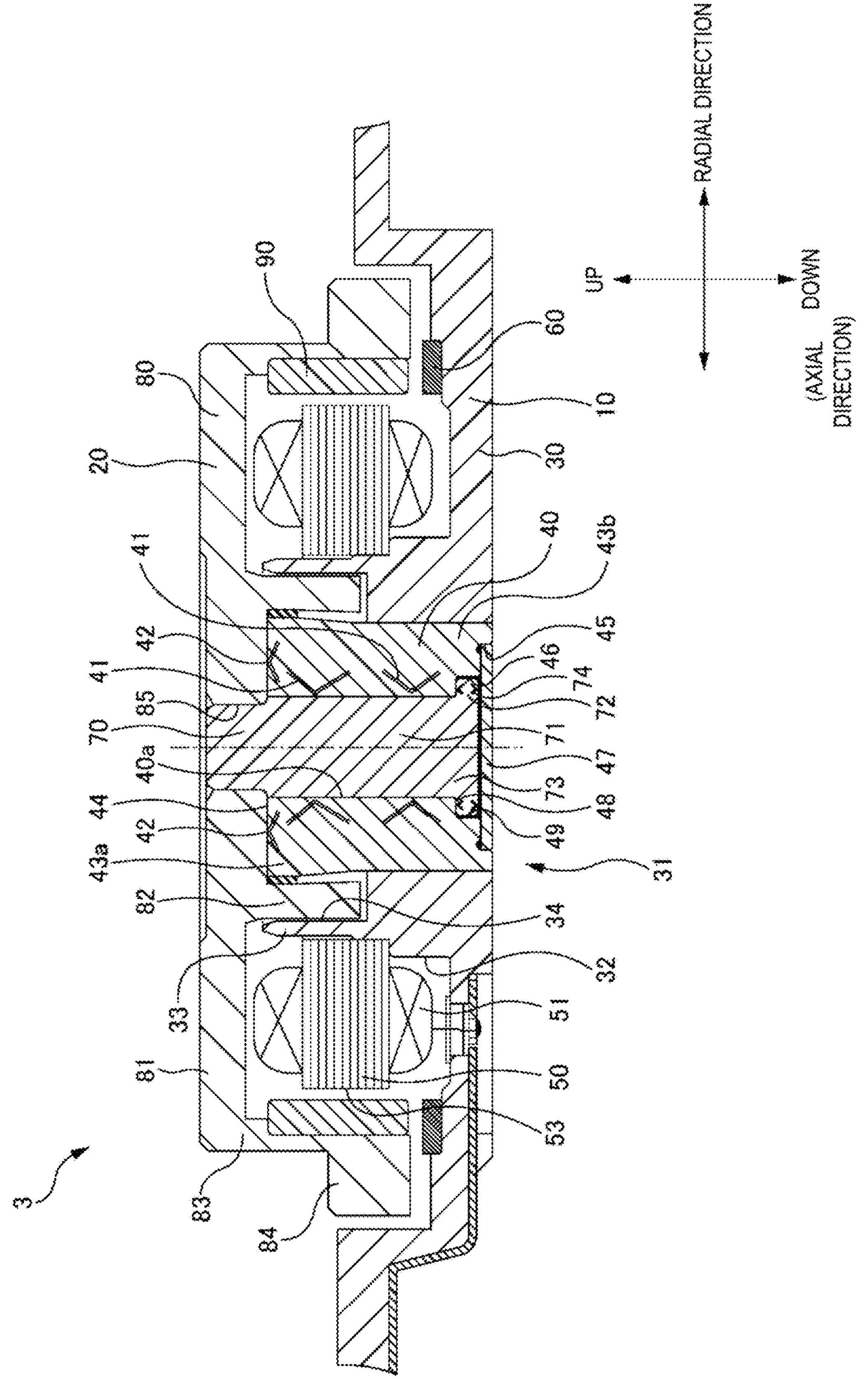
FIG. 2 is a partial cross-sectional view of a spindle motor 3.

FIG. 1 is a perspective view illustrating a configuration of a hard disk drive device 1. FIG. 2 is a partial cross-sectional view illustrating an example of a spindle motor 3 to be used for the hard disk drive device 1.

Here, as illustrated in FIG. 2, a direction parallel to a center axis of a shaft 70 to be described later is defined as an axial direction, a direction around the center axis of the shaft 70 is defined as a circumferential direction, and a direction perpendicular to the axial direction is defined as a radial direction. For the sake of description, the axial direction is defined as an up-down direction, a rotating part 20 side relative to a stationary part 10 is defined as an upper side, and the stationary part 10 side is defined as a lower side.

Hard Disk Drive Device

The hard disk drive device 1 includes a housing 2, a spindle motor 3, recording disks 4, and a bearing device 5.

The housing 2 includes a case 6 and a cover 7. The case 6 has an approximately rectangular parallelepiped bottomed box-like shape with one surface opened. The cover 7 is a plate-shaped member closing the opened surface of the case 6. The cover 7 is fastened to the case 6 by using screws 7A. A sealing part (not illustrated) is provided between the case 6 and the cover 7, and thus the cover 7, together with the case 6, forms the housing 2 having a hermetically sealed interior space S.

The interior space S of the housing 2 is filled with air or helium gas having a density lower than the density of air. Note that the interior space S may be filled with, for example, nitrogen gas or a mixed gas of helium and nitrogen in addition to air or helium gas. The spindle motor 3, the recording disks 4, and the bearing device 5 are accommodated in the interior space S.

The spindle motor 3 (as an example of a motor) rotatably supports a plurality of the recording disks 4. Note that a detailed structure of the spindle motor 3 will be described later.

The plurality of recording disks 4 are provided and supported by the spindle motor 3 such that respective disk surfaces are opposed to one another. Gaps are formed between the respective recording disks 4.

The bearing device 5 swingably supports a plurality of swing arms 8 disposed in the gaps between the respective recording disks 4.

A magnetic head 9 is provided at a tip part of the swing arm 8. The magnetic head 9 imparts magnetism to the recording disk 4 and reads magnetism from the recording disk 4. When the swing arm 8 swings, the magnetic head 9 moves over the recording disk 4.

When the spindle motor 3 rotates, the recording disks 4 also rotate. In this state, when the swing arm 8 swings, the magnetic head 9 moves over the rotating recording disk 4. Then, the magnetic head 9 imparts magnetism to the recording disk 4 and records data to the recording disk 4. Further, the magnetic head 9 reads magnetism from the recording disk 4 and reads out data recorded on the recording disk 4.

Note that a heat-assisted magnetic recording (HAMR) system may be employed as a recording system of the hard disk drive device 1.

Spindle Motor

Next, a detailed configuration of the spindle motor 3 will be described. FIG. 2 is a partial cross-sectional view illustrating the configuration of the spindle motor 3. The spindle motor 3 includes a stationary part 10 and a rotating part 20 rotating relative to the stationary part 10 through a bearing mechanism.

Stationary Part

The stationary part 10 includes a base plate 30, a bearing sleeve 40, a stator core 50, and a magnetic attraction plate 60.

The base plate 30 is a member made of a metal. Note that the base plate 30 is not limited to being made of a metal, and may be made of resin, for example. The base plate 30 is formed with a through hole 31, a circumferential groove part 32, a circumferential wall part 33, and a plate recessed part 34.

The through hole 31 is a hole for fixing the bearing sleeve 40. The through hole 31 is provided so as to penetrate the base plate 30 in the axial direction. The through hole 31 has a tubular shape, and an inner diameter of the tube is approximately equal to or larger than an outer diameter of the bearing sleeve 40.

The circumferential groove part 32 is formed outside the through hole 31 in the radial direction. The circumferential groove part 32 is an annular groove provided so as to be coaxial with the center axis of the through hole 31 when viewed in the axial direction.

The circumferential wall part 33 is formed at an outer side relative to the through hole 31 and at an inner side relative to the circumferential groove part 32 in the radial direction. The circumferential wall part 33 is an annular wall provided so as to be coaxial with the center axis of the through hole 31 when viewed in the axial direction, and protrudes upward in the axial direction.

The plate recessed part 34 is formed at the inner side of the circumferential wall part 33 in the radial direction. The plate recessed part 34 is a columnar space provided so as to be coaxial with the center axis of the through hole 31 when viewed in the axial direction, and opens upward. A diameter of the plate recessed part 34 is larger than an outer diameter of the through hole 31. The plate recessed part 34 is connected with an upper side of the through hole 31 in the axial direction.

The bearing sleeve 40 rotatably supports the shaft 70. The bearing sleeve 40 is a cylindrical member made of iron, such as stainless steel, and extending in the axial direction. The bearing sleeve 40 is inserted into the through hole 31 (see FIG. 2). The bearing sleeve 40 is fixed to the through hole 31 with an adhesive applied to one surface or both surfaces of an outer peripheral surface of the bearing sleeve 40 and an inner peripheral surface of the through hole 31. Note that the bearing sleeve 40 is not limited to being made of iron, and may be a member made of a metal such as aluminum or brass. The bearing sleeve 40 is provided with radial dynamic pressure generating grooves 41 and a thrust dynamic pressure generating groove 42.

The radial dynamic pressure generating grooves 41 are provided at an inner peripheral surface 40*a* of the bearing sleeve 40. In the present embodiment, the radial dynamic pressure generating grooves 41 are formed at the inner peripheral surface 40*a* in a continuous row in the circumferential direction, and are formed in two rows with an interval in the axial direction.

The thrust dynamic pressure generating groove 42 is provided at an end surface 44 of a sleeve end part 43*a* positioned at the upper side of the bearing sleeve 40 in the axial direction. The thrust dynamic pressure generating groove 42 is provided in an annular shape so as to be coaxial with the center axis of the bearing sleeve 40 as viewed in the axial direction.

A large-diameter recessed part 45 and a small-diameter recessed part 46 are formed continuously in the axial direction at the sleeve end part 43*b* of the bearing sleeve 40 at the lower side in the axial direction. Then, a counter plate 47 is attached to the large-diameter recessed part 45.

The large-diameter recessed part 45 is formed at the sleeve end part 43*b*. The large-diameter recessed part 45 is a columnar space provided so as to be coaxial with the center axis of the through hole 31 when viewed in the axial direction. The large-diameter recessed part 45 opens downward.

The small-diameter recessed part 46 is formed at the upper side of the large-diameter recessed part 45 in the sleeve end part 43*b*. The small-diameter recessed part 46 is a columnar space provided so as to be coaxial with the center axis of the through hole 31 when viewed in the axial direction. The small-diameter recessed part 46 is connected to the large-diameter recessed part 45 in the axial direction. A diameter of the small-diameter recessed part 46 is smaller than a diameter of the large-diameter recessed part 45. Since the small-diameter recessed part 46 is formed at the sleeve end part 43*b*, the bearing sleeve 40 is formed with an annular surface 48 having an annular shape in a view in the axial direction and an inner peripheral side surface 49 in the circumferential direction.

The counter plate 47 is a lid having a disk shape and inserted into the large-diameter recessed part 45 from below the sleeve end part 43*b*. The counter plate 47 closes the large-diameter recessed part 45 and the small-diameter recessed part 46. The counter plate 47 is a member made of an iron, such as stainless steel. An outer diameter of the counter plate 47 is substantially equal to an inner diameter of the large-diameter recessed part 45. A thickness of the counter plate 47 in the axial direction is substantially equal to a depth of the large-diameter recessed part 45. Note that the counter plate 47 is not limited to being made of iron, and may be a member made of a metal such as aluminum or brass.

When the counter plate 47 is inserted into the large-diameter recessed part 45, an outer edge part of the counter plate 47 and an inner edge part of the large-diameter recessed part 45 are welded together by laser welding. In this way, the counter plate 47 is fixed to the bearing sleeve 40 without a gap and closes the large-diameter recessed part 45 and the small-diameter recessed part 46.

Figure 3:
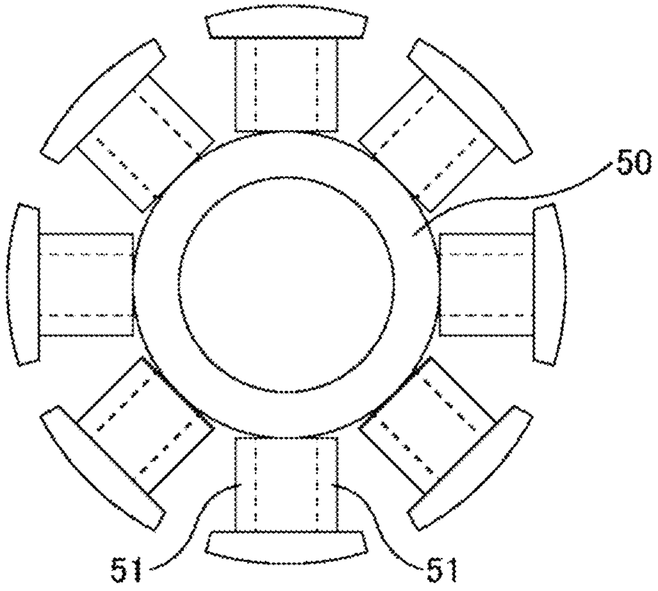
FIG. 3 is a top view of a stator core 50.
Figure 4:
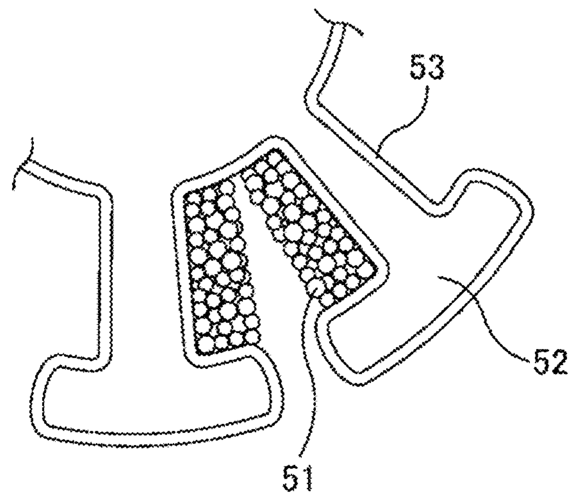
FIG. 4 is a partial cross-sectional view of the stator core 50 taken along a plane perpendicular to an axial direction.

The stator core 50 is a member formed by stacking, in the axial direction, a plurality of annular electromagnetic steel plates when viewed in the axial direction. The stator core 50 is disposed inside the circumferential groove part 32 and is fixed by a method such as bonding. A surface of the stator core 50 is covered with a coating film 53. As illustrated in FIG. 3, the stator core 50 includes a plurality of pole teeth (protruding poles) extending outward in the radial direction and disposed along the circumferential direction. A coil 51 is wound around the pole teeth. When a current flows through the coil 51, the stator core 50 generates a magnetic flux. Note that a method for manufacturing the stator core 50 will be described below.

The magnetic attraction plate 60 is a member for stabilizing rotation of a rotor hub 80 to be described later. The magnetic attraction plate 60 is made of, for example, a magnetic material. The magnetic attraction plate 60 generates a magnetic flux according to the current supplied to the coil 51. The magnetic attraction plate 60 is disposed at the outer side relative to the stator core 50 in the radial direction at the circumferential groove part 32.

Rotating Part

The rotating part 20 includes the shaft 70, the rotor hub 80, and a rotor magnet 90.

The shaft 70 is a member serving as a rotation axis of the spindle motor 3. The shaft 70 is rotatably supported inside the bearing sleeve 40. The shaft 70 includes a shaft part 71 having a pillar shape and a flange part 72. In the shaft 70, the shaft part 71 and the flange part 72 are integrated with each other.

The shaft part 71 is a columnar shaft member. In the shaft part 71, a shaft end part 73 at the lower side is integrally provided with the flange part 72. The shaft part 71 is disposed inside the bearing sleeve 40 such that the shaft end part 73 provided with the flange part 72 is positioned at the lower side. That is, an outer peripheral surface of the shaft part 71 is surrounded by the inner peripheral surface 40*a* of the bearing sleeve 40. Then, the outer peripheral surface of the shaft part 71 and the inner peripheral surface 40*a* of the bearing sleeve 40 are opposed to each other with a minute gap. Note that the radial dynamic pressure generating grooves 41 may be formed at the outer peripheral surface of the shaft part 71 instead of the inner peripheral surface 40*a* of the bearing sleeve 40.

The flange part 72 is a ring-shaped flange member expanding in the radial direction when viewed in the axial direction. The flange part 72 is joined to the shaft end part 73 and integrated with the shaft part 71. An outer diameter of the flange part 72 is smaller than an inner diameter of the small-diameter recessed part 46. Thrust dynamic pressure generating grooves 74 are formed at the respective upper surface and lower surface of the flange part 72.

The thrust dynamic pressure generating grooves 74 are provided at the upper surface and the lower surface of the flange part 72. The thrust dynamic pressure generating groove 74 is provided in an annular shape so as to be coaxial with the center axis of the flange part 72 as viewed in the axial direction.

The flange part 72 is disposed at the small-diameter recessed part 46 in a state of supporting the shaft 70 by the bearing sleeve 40. The upper surface of the flange part 72 is opposed to an annular surface 48 formed by the small-diameter recessed part 46 at the bearing sleeve 40 with a minute gap. The lower surface of the flange part 72 is opposed to an upper surface of the counter plate 47 with a minute gap. A side surface of the flange part 72 is opposed to the inner peripheral side surface 49 with a minute gap. Since the flange part 72 is disposed between the annular surface 48 and the counter plate 47, the flange part 72 and the shaft 70 are prevented from moving in the axial direction.

A lubricating oil is filled between the shaft 70 and the bearing sleeve 40. To be more specific, the lubricating oil is filled between the outer peripheral surface of the shaft part 71 and the inner peripheral surface 40*a* of the bearing sleeve 40, between the upper surface of the flange part 72 and the annular surface 48, between the lower surface of the flange part 72 and the upper surface of the counter plate 47, and between the side surface of the flange part 72 and the inner peripheral side surface 49.

The rotor hub 80 is a member configured to rotate together with the shaft 70. The rotor hub 80 is attached to an upper end of the shaft 70 and is connected with the shaft 70. The rotor hub 80 includes a disk part 81, a first cylindrical part 82, a second cylindrical part 83, and an outer edge part 84.

The disk part 81 is a disk-shaped member being coaxial with the center axis of the shaft 70 in a view in the axial direction. The disk part 81 includes a rotor hub through hole 85. The rotor hub through hole 85 is provided at the center of the disk part 81 as viewed in the axial direction. The disk part 81 is fixed to the shaft 70. To be more specific, by inserting and fixing the upper end of the shaft 70 into the rotor hub through hole 85 by a method such as press-fitting or bonding, the disk part 81 is fixed to the shaft 70. In a state of supporting the shaft 70 by the bearing sleeve 40, the disk part 81 is opposed to the end surface 44 of the bearing sleeve 40 with a minute gap.

The first cylindrical part 82 is a cylindrical member having a thickness in the radial direction. The first cylindrical part 82 is provided so as to be coaxial with the center axis of the rotor hub through hole 85 as viewed in the axial direction, and protrudes downward in the axial direction. An inner diameter of the first cylindrical part 82 is larger than the outer diameter of the bearing sleeve 40. An inner peripheral surface of the first cylindrical part 82 is opposed to the outer peripheral surface of the bearing sleeve 40 with a gap. An outer diameter of the first cylindrical part 82 is smaller than an inner diameter of the circumferential wall part 33. An outer peripheral surface of the first cylindrical part 82 is opposed to an inner peripheral surface of the circumferential wall part 33 with an interval.

The second cylindrical part 83 is a cylindrical member having a thickness in the radial direction. The second cylindrical part 83 is provided so as to be coaxial with the center axis of the rotor hub through hole 85 as viewed in the axial direction, and protrudes downward in the axial direction. The second cylindrical part 83 is provided at an outer edge of the disk part 81.

The outer edge part 84 is an annular member. The outer edge part 84 is provided at a lower end of the second cylindrical part 83. The outer edge part 84 protrudes outward in the radial direction from the second cylindrical part 83 and is formed in a flange shape. The plurality of recording disks 4 are installed above the outer edge part 84 and at an outer side in the radial direction of the second cylindrical part 83 (see FIG. 1).

A lubricating oil is filled between the rotor hub 80 and the bearing sleeve 40. To be specific, the lubricating oil is filled between a lower surface of the disk part 81 at an inner side in the axial direction relative to the first cylindrical part 82 and the end surface 44 of the sleeve end part 43*a* at an upper side in the axial direction of the bearing sleeve 40.

The rotor magnet 90 is an annular member having a magnetic pole structure magnetized in a state of the polarities of N and S being alternately reversed along the circumferential direction when viewed in the axial direction. In the present embodiment, the rotor magnet 90 is attached to an inner peripheral surface of the second cylindrical part 83. The rotor magnet 90 is at approximately the same position as the stator core 50 in the axial direction, and is at approximately the same position as the magnetic attraction plate 60 in the radial direction.

The structure of the spindle motor 3 has been described above. Note that the above description is an example of the structure of the motor. Therefore, the structure of the motor is not limited to the above structure, and may be another structure.

Operation of Spindle Motor

When the coil 51 is energized, magnetic attractive forces and magnetic repulsion forces generated between the magnetic poles of the rotor magnet 90 and the pole teeth of the stator core 50 are switched. As a result, the rotating part 20 rotates using the shaft 70 as the rotation axis relative to the stationary part 10.

The shaft 70 rotates relative to the bearing sleeve 40. At this time, the lubricating oil is pressurized by the radial dynamic pressure generating grooves 41 and the thrust dynamic pressure generating grooves 74, and thus dynamic pressure is generated on the lubricating oil. By the generated dynamic pressure, the shaft 70 is supported in a non-contact state in the radial direction and the axial direction with respect to the bearing sleeve 40.

The shaft 70 rotates, and thus the rotor hub 80 is rotated relative to the bearing sleeve 40. At this time, the lubricating oil is pressurized by the thrust dynamic pressure generating groove 42, and thus dynamic pressure is generated on the lubricating oil. By the generated dynamic pressure, the rotor hub 80 is supported in a non-contact state in the axial direction with respect to the bearing sleeve 40.

Method for Manufacturing Stator Core

Next, a method for manufacturing the stator core 50 will be described. The method for manufacturing the stator core 50 includes film-forming and heating, and fixing.

First, the film-forming and heating will be described. The stator core 50 is formed by applying electrodeposition coating to a surface of a stacked body of electromagnetic steel plates. First, a plate-shaped electromagnetic steel plate is punched by a press or the like to be formed into a shape having pole teeth annularly and radially when viewed in the axial direction as illustrated in FIG. 3. Next, formed electromagnetic steel plates 52 are stacked in the axial direction to form a stacked body of the electromagnetic steel plates 52. The stacked body of the electromagnetic steel plates 52 is joined by crimping or laser welding the electromagnetic steel plates 52 vertically adjacent to each other. That is, the plurality of stacked electromagnetic steel plates 52 are integrated to form the stacked body.

Next, electrodeposition coating is performed on the stacked body of the electromagnetic steel plates 52. The electrodeposition coating is a treatment of immersing a coating target member in a tank filled with a coating material, causing the coating material to adhere to a surface of the coating target member by energizing the coating target member, and then drying and thermally curing the coating material. The coating material may contain pigments such as a coloring pigment, an extender pigment, and a rust-preventive pigment. Examples of the coloring pigment include black pigments such as carbon black, acetylene black, graphite, iron black, and aniline black, and white pigments such as titanium white, zinc oxide, lithopone, zinc sulfide, and antimony white. Further, examples of the extender pigment include clay, mica, baryta, kaolin, talc, calcium carbonate, silica, barium sulfate, alumina white, and aluminum silicate. Further, examples of the rust-preventive pigment include aluminum phosphomolybdate, aluminum dihydrogen tripolyphosphate, and zinc oxide. In the present embodiment, a coating film forming material containing a benzene ring-containing epoxy resin and a pigment containing an aluminum silicate component is used as the coating material. Note that a coating material containing an epoxy-polyamide-based resin may be used as the coating material.

In order to perform electrodeposition coating on the stacked body of the electromagnetic steel plates 52, the stacked body of the electromagnetic steel plates 52 is immersed and energized in a tank filled with the coating material. When the stacked body of the electromagnetic steel plates 52 is pulled up from the tank, the coating material adheres to the surface of the stacked body of the electromagnetic steel plates 52.

Next, the stacked body of the electromagnetic steel plates 52 with the coating material adhering to the surface is heated, and the coating material is heated and cured. Here, the stacked body of the electromagnetic steel plates 52 with the coating material adhering to the surface is normally heated at a temperature of about 200° C. to 220° C. for about 10 minutes to 60 minutes, but in the present embodiment, is heated at a temperature of 280° C. for about 10 minutes to 60 minutes. The heating temperature is preferably 250° C. or higher because the heating time can be shortened. As described above, when the coating material is heated and cured, setting the heating temperature to be high without changing the heating time or setting the heating time to be long without changing the heating temperature to promote thermal curing of the coating material more than usual is called overbaking. That is, the coating film 53 being an epoxy resin-containing electrodeposition coating film subjected to overbaking is formed at the surface of the stacked body of the electromagnetic steel plates 52. In this way, the stator core 50 is manufactured.

Next, the fixing will be described. First, an adhesive is applied to an inner peripheral surface and an inner edge part of a lower surface of the stator core 50 manufactured in the film-forming and coating. Then, the stator core 50 is inserted and fixed into the circumferential groove part 32 from above the base plate 30 such that an axial center of the stator core 50 and an axial center of the through hole 31 are aligned with each other. In this way, the stator core 50 is fixed to the base plate 30.

Here, overbaking will be described below. The overbaking is to bake a coating film-forming material by supplying energy larger than energy required for setting crosslinks (bonds) existing between molecules constituting the coating film to a desired state (that is, a cured state). The overbaking may be caused by excessive heating time, excessive heating temperature, or both excessive heating time and excessive heating temperature.

Overbaking of a coating film containing resin or the like may result in more crosslinks being formed than crosslinks by predetermined baking. Then, the overbaking results in more crosslinks being formed, the number of positions capable of forming the crosslinks is reduced, and thus the overbaked coating film containing the resin or the like causes uptake of oxygen atoms contributing to crosslink formation to be suppressed. Additionally, the formation of the crosslinks caused by the overbaking is considered to lead to an increase in hardness of the overbaked coating film containing the resin or the like.

In addition, the overbaking may rupture (cleave) again crosslinks (bonds) existing between molecules constituting the coating film. The cleavage position of the bond may change a light absorption wavelength or an amount of light absorption of the coating film. As a result, it is considered that a change occurs in an absorption spectrum of the coating film after the overbaking as compared with the coating film before the overbaking.

In the above-described stator core 50, the coating film 53 preferably has a pencil hardness of 5H or higher. Note that the pencil hardness is measured in accordance with JIS K 5600.

In addition, when an absorption spectrum of the coating film 53 is measured by Fourier transform infrared spectroscopy, a value of a ratio x of peak intensities calculated from the obtained absorption spectrum by using Equation (1) below is 0.8 or less, and is more preferably 0.6 or less.

$$x = I_{polymer}/I_{pigment} \quad (1)$$

Here, $I_{polymer}$ represents a value of a peak intensity at a wave number corresponding to an absorbance derived from a benzene ring of resin, and $I_{pigment}$ represents a value of a peak intensity at a wave number corresponding to an absorbance derived from a pigment containing an aluminum silicate component.

For example, when an epoxy resin containing a benzene ring is used as the resin, as $I_{polymer}$, a peak intensity in the vicinity of wave numbers from 1490 $cm^{-1}$ to 1520 $cm^{-1}$ can be employed. Moreover, for example, when a pigment containing an aluminum silicate component is used as the pigment, as $I_{pigment}$, a peak intensity in the vicinity of wave numbers from 995 $cm^{-1}$ to 1010 $cm^{-1}$ can be employed.

Note that the absorption spectrum is obtained by directly measuring an infrared (IR) absorption spectrum of the coating film 53 formed at the surface of the stator core 50 by an attenuated total reflection (ATR) method using a diamond crystal (prism). In the ATR method, the shape of a spectrum is changed due to a difference in refractive index between a sample and a prism, and ATR correction is generally performed particularly in the case of comparison with data measured by a transmission method. Further, in measurement by infrared spectroscopy (IR method), background (no sample) measurement immediately before sample measurement is generally performed to eliminate the influence of the background due to the atmosphere.

Note that the method for manufacturing the stator core 50 may include film-forming and first heating, second heating, and fixing instead of the above-described manufacturing method.

First, the film-forming and first heating will be described. The process of stacking the plurality of electromagnetic steel plates 52 in the axial direction and forming the integrated stacked body is the same as the process described in the film-forming and heating described above, and thus the description of the process of stacking the plurality of electromagnetic steel plates 52 in the axial direction and forming the integrated stacked body will be omitted.

Next, electrodeposition coating is performed on the stacked body of the electromagnetic steel plates 52. As a coating material, a coating film forming material containing a benzene ring-containing epoxy resin and a pigment containing an aluminum silicate component is used. Note that a coating material containing an epoxy-polyamide-based resin may be used as the coating material.

In order to perform electrodeposition coating on the stacked body of the electromagnetic steel plates 52, the stacked body of the electromagnetic steel plates 52 is immersed and energized in a tank filled with the coating material. When the stacked body of the electromagnetic steel plates 52 is pulled up from the tank, the coating material adheres to the surface of the stacked body of the electromagnetic steel plates 52.

Next, the stacked body of the electromagnetic steel plates 52 with the coating material adhering to the surface is heated, and the coating material is heated and cured. In the process, conditions for a heating temperature and a heating time may be a temperature and a time for curing the coated coating material, and may be appropriately selected depending on the type of the coating material. For example, the stacked body of the electromagnetic steel plates 52 with the coating material adhering to the surface is heated at a temperature of about 200° C. to 220° C. for about 10 minutes to 60 minutes. As a result, the coating material adhering to the surface of the stacked body of the electromagnetic steel plates 52 is cured to form a coating film.

Next, the second heating will be described. The second heating is overbaking of heating the coating film at a higher temperature than the temperature of the film-forming and first heating. In the second heating, the stacked body of the electromagnetic steel plates 52 coated with the coating film manufactured in the above-described film-forming and first heating is heated at a still higher temperature. For example, the stacked body of the electromagnetic steel plates 52 coated with the coating film is heated at a temperature of 280° C. for about 10 minutes to 60 minutes. The heating temperature in the second heating is preferably 250° C. or higher because the heating time can be shortened. However, depending on a constituent material of the coating film, heating at a specific temperature or higher (300° C. in the case of a coating film containing an epoxy resin) may cause thermal decomposition of the coating film, and thus special attention is required. As a result, the coating film 53 being an epoxy resin-containing electrodeposition coating film subjected to overbaking is formed at the surface of the stacked body of the electromagnetic steel plates 52. In this way, the stator core 50 is manufactured.

Finally, the fixing will be described. The fixing is a process of fixing the stator core 50 manufactured in the second heating to the base plate 30. Since the method for fixing the stator core 50 is the same as the method in the fixing described above, the description of the method for fixing the stator core 50 will be omitted.

Second Embodiment

Figure 5:
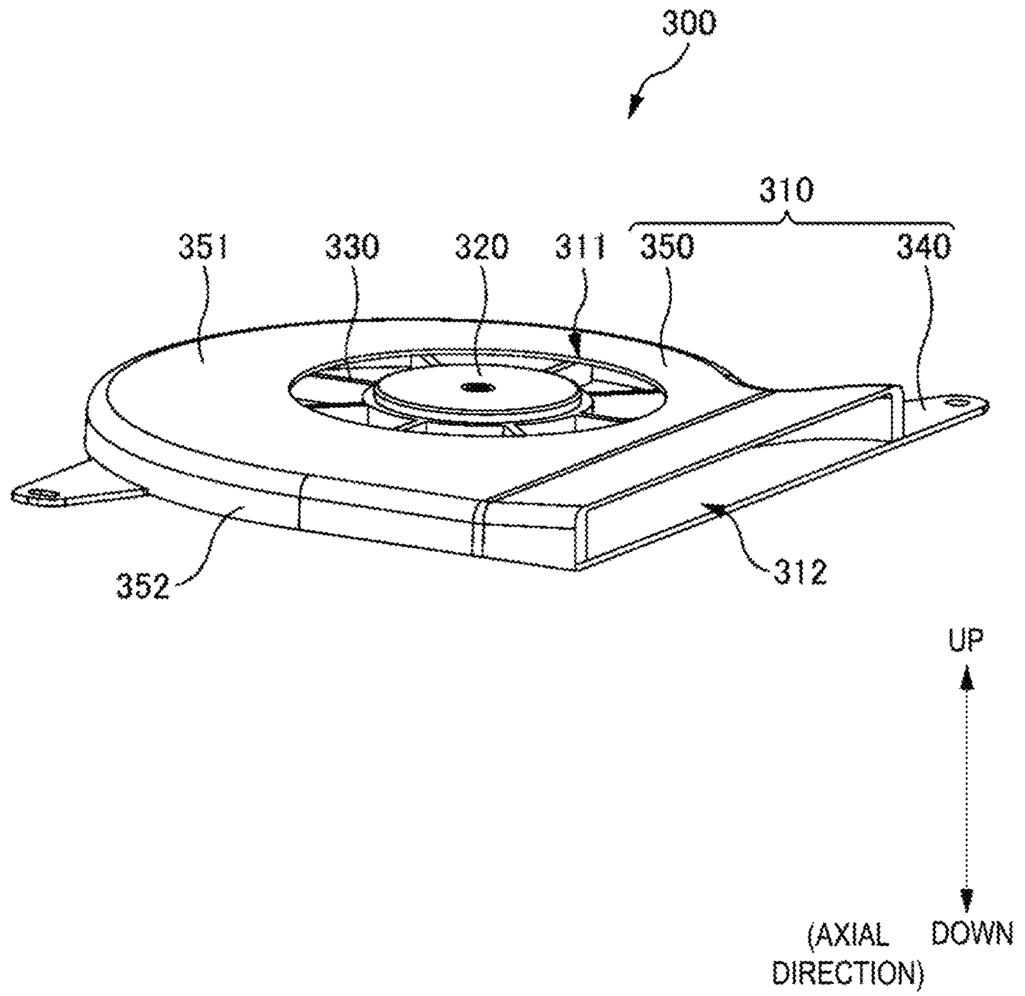
FIG. 5 is a perspective view of a blower 300.

Next, a blower 300 according to a second embodiment will be described with reference to FIG. 5 to FIG. 7. FIG. 5 is a perspective view of the blower 300. The blower 300 is a centrifugal blower. The blower 300 is not limited to the centrifugal blower and may be, for example, an axial blower or a mixed flow blower. The blower 300 includes a casing 310, a motor 320, and an impeller 330.

Figure 7:
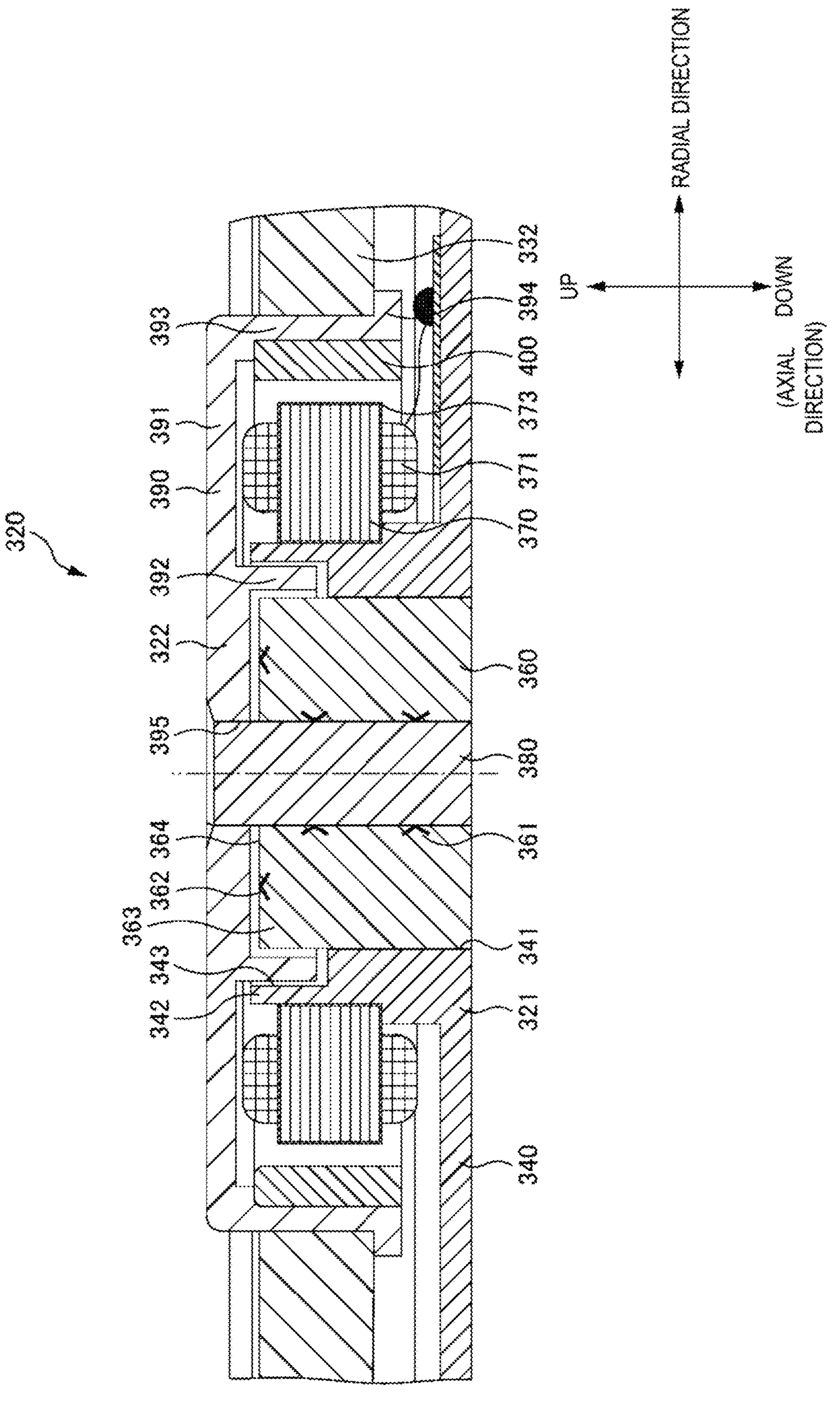
FIG. 7 is a cross-sectional view taken along a plane including a center axis of a shaft 380 in the blower 300.

Here, as illustrated in FIG. 7, for example, a direction parallel to a center axis of a shaft 380 of the motor 320 to be described later is defined as an axial direction, a direction around a center axis of the shaft 380 is defined as a circumferential direction, and a direction perpendicular to the axial direction is defined as a radial direction. In addition, for the sake of description, the axial direction is defined as an up-down direction, a base plate 340 side to be described below is defined as a lower side, and a lid 350 side is defined as an upper side.

Casing

The casing 310 is a housing configured to accommodate the motor 320 and the impeller 330. The casing 310 is formed by combining a base plate 340 and a lid 350. The casing 310 includes a suction port 311 and a blowout port 312. In the present embodiment, the suction port 311 is provided at the lid 350. Further, the blowout port 312 is provided at a side surface of the casing 310 and faces outward in the radial direction.

The base plate 340 is a member made of a metal. The motor 320 is disposed at the base plate 340. A structure of the base plate 340 will be described together with a structure of the motor 320.

The lid 350 is a member forming an interior space of the casing 310 together with the base plate 340. The lid 350 includes a flat plate part 351 and a side wall part 352.

The flat plate part 351 is a plate-shaped member. When the base plate 340 and the lid 350 are combined, the flat plate part 351 is opposed to the base plate 340. The flat plate part 351 includes the suction port 311. The suction port 311 is a hole penetrating the flat plate part 351 in the axial direction. A diameter of the suction port 311 is larger than a diameter of a rotor hub 390 of the motor 320 to be described later.

The side wall part 352 is a portion extending in the axial direction from an edge of the flat plate part 351. The side wall part 352 is interrupted at a partial portion of the edge of the flat plate part 351. Therefore, when the base plate 340 and the lid 350 are combined with each other, a portion not formed with the side wall part 352 serves as an opening. This opening is the blowout port 312.

Motor

Figure 6:
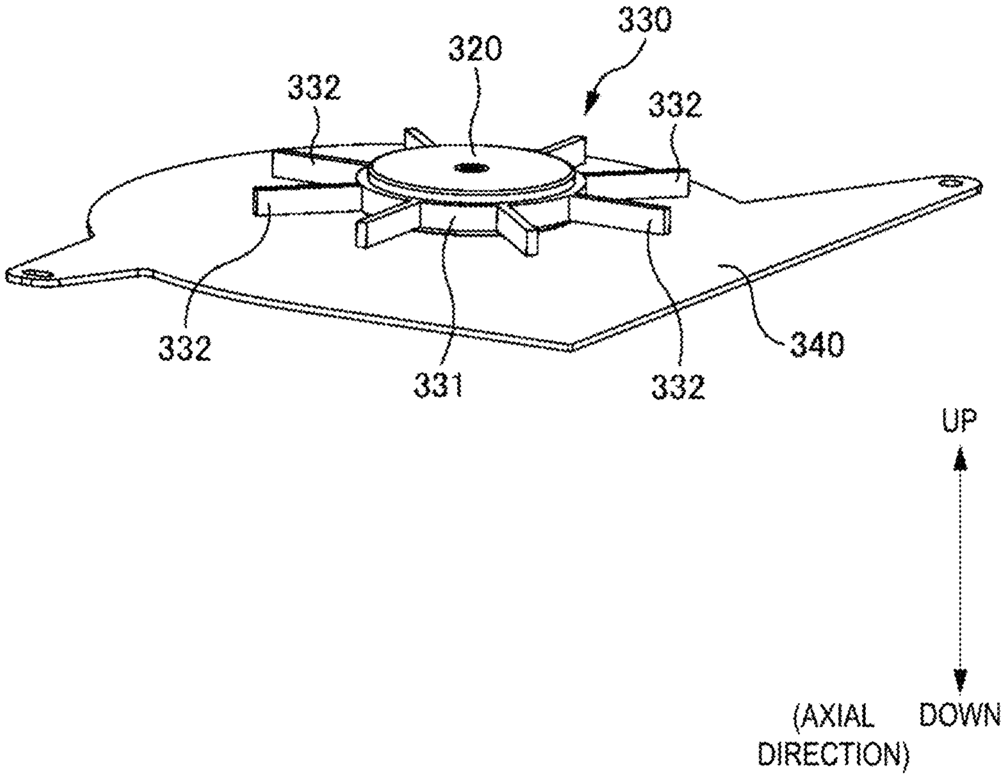
FIG. 6 is a perspective view illustrating a state of removing a lid 350 from the blower 300.

FIG. 6 is a perspective view of a state of removing the lid 350 from the blower 300, and FIG. 7 is a cross-sectional view taken along a plane including the center axis of the shaft 380. The motor 320 includes a stationary part 321 and a rotating part 322.

Stationary Part

The stationary part 321 includes the base plate 340, a bearing sleeve 360, and a stator core 370.

The base plate 340 includes a through hole 341, a circumferential wall part 342, and a recessed part 343.

The through hole 341 is a hole for fixing the bearing sleeve 360. The through hole 341 is provided so as to penetrate the base plate 340 in the axial direction. The through hole 341 has a tubular shape, and an inner diameter of the tube is approximately equal to or larger than an outer diameter of the bearing sleeve 360.

The circumferential wall part 342 is formed outside the through hole 341 in the radial direction. The circumferential wall part 342 is an annular wall provided so as to be coaxial with the center axis of the through hole 341 when viewed in the axial direction, and protrudes upward in the axial direction.

The recessed part 343 is formed inside the circumferential wall part 342 in the radial direction. The recessed part 343 is a columnar space provided so as to be coaxial with the center axis of the through hole 341 when viewed in the axial direction, and opens upward. A diameter of the recessed part 343 is larger than an outer diameter of the through hole 341. The recessed part 343 is connected to the upper side of the through hole 341 in the axial direction.

The bearing sleeve 360 rotatably supports the shaft 380. The bearing sleeve 360 is a cylindrical member made of iron and extending in the axial direction. The bearing sleeve 360 is inserted into the through hole 341 (see FIG. 7). The bearing sleeve 360 is fixed to the through hole 341 with an adhesive applied to one surface or both surfaces of an outer peripheral surface of the bearing sleeve 360 and an inner peripheral surface of the through hole 341. Note that the bearing sleeve 360 is not limited to a member made of an iron such as stainless steel, and may be made of a resin, for example. The bearing sleeve 360 is provided with radial dynamic pressure generating grooves 361 and a thrust dynamic pressure generating groove 362.

The radial dynamic pressure generating grooves 361 are provided at an inner peripheral surface of the bearing sleeve 360. In the present embodiment, the radial dynamic pressure generating grooves 361 are formed at the inner peripheral surface in a continuous row in the circumferential direction, and are formed in two rows with an interval in the axial direction.

The thrust dynamic pressure generating groove 362 is provided at an end surface 364 of the sleeve end part 363 at the upper side of the bearing sleeve 360 in the axial direction. The thrust dynamic pressure generating groove 362 is provided in an annular shape so as to be coaxial with the center axis of the bearing sleeve 360 as viewed in the axial direction.

The stator core 370 is a member formed by stacking, in the axial direction, a plurality of electromagnetic steel plates having an annular shape in a view in the axial direction. The stator core 370 is disposed outside the circumferential wall part 342 in the radial direction and is fixed by a method such as bonding. A surface of the stator core 370 is covered with a coating film 373. The stator core 370 includes a plurality of pole teeth (protruding poles) extending outward in the radial direction and disposed along the circumferential direction. A coil 371 is wound around the pole teeth. When a current flows through the coil 371, the stator core 370 generates a magnetic flux. Note that since a method for manufacturing the stator core 370 is the same as the method for manufacturing the stator core 50 according to the first embodiment, the description of the method for manufacturing the stator core 370 will be omitted.

Rotating Part

The rotating part 322 includes the shaft 380, the rotor hub 390, and a rotor magnet 400.

The shaft 380 is a member serving as a rotation axis of the motor 320. The shaft 380 is a cylindrical shaft member. The shaft 380 is disposed inside and rotatably supported by the bearing sleeve 360. An outer peripheral surface of the shaft 380 and an inner peripheral surface of the bearing sleeve 360 are opposed to each other with a minute gap. Note that the radial dynamic pressure generating grooves 361 may be formed at the outer peripheral surface of the shaft 380 instead of the inner peripheral surface of the bearing sleeve 360.

A lubricating oil is filled between the shaft 380 and the bearing sleeve 360. Specifically, the lubricating oil is filled between the outer peripheral surface of the shaft 380 and the inner peripheral surface of the bearing sleeve 360.

The rotor hub 390 is a member configured to rotate together with the shaft 380. The rotor hub 390 is attached to an upper end of the shaft 380 and is connected with the shaft 380. The rotor hub 390 includes a disk part 391, a first cylindrical part 392, a second cylindrical part 393, and an outer edge part 394.

The disk part 391 is a disk-shaped member formed so as to be coaxial with the center axis of the shaft 380 when viewed in the axial direction. The disk part 391 includes a rotor hub through hole 395. The rotor hub through hole 395 is provided at a center of the disk part 391 as viewed in the axial direction. The disk part 391 is fixed to the shaft 380. Specifically, the upper end of the shaft 380 is inserted and fixed into the rotor hub through hole 395 by a method such as press-fitting or bonding, so that the disk part 391 is fixed to the shaft 380. In a state of supporting the shaft 380 by the bearing sleeve 360, the disk part 391 is opposed to the end surface 364 of the bearing sleeve 360 with a minute gap.

The first cylindrical part 392 is a cylindrical member having a thickness in the radial direction. The first cylindrical part 392 is provided so as to be coaxial with a center axis of the rotor hub through hole 395 when viewed in the axial direction, and protrudes downward in the axial direction. An inner diameter of the first cylindrical part 392 is larger than an outer diameter of the bearing sleeve 360. An inner peripheral surface of the first cylindrical part 392 is opposed to the outer peripheral surface of the bearing sleeve 360 with a gap. An outer diameter of the first cylindrical part 392 is smaller than an inner diameter of the circumferential wall part 342. An outer peripheral surface of the first cylindrical part 392 is opposed to an inner peripheral surface of the circumferential wall part 342 with an interval.

The second cylindrical part 393 is a cylindrical member having a thickness in the radial direction. The second cylindrical part 393 is provided so as to be coaxial with the center axis of the rotor hub through hole 395 as viewed in the axial direction, and protrudes downward in the axial direction. The second cylindrical part 393 is provided at an outer edge of the disk part 391.

The outer edge part 394 is an annular member. The outer edge part 394 is provided at a lower end of the second cylindrical part 393. The outer edge part 394 protrudes outward in the radial direction from the second cylindrical part 393 and is formed in a flange shape. The impeller 330 is disposed above the outer edge part 394 and outside the second cylindrical part 393 in the radial direction (see FIG. 6 and FIG. 7).

A lubricating oil is filled between the rotor hub 390 and the bearing sleeve 360. Specifically, the lubricating oil is filled between the lower surface of the disk part 391 at the inner side relative to the first cylindrical part 392 in the axial direction and the end surface 364 of the sleeve end part 363 at the upper side of the bearing sleeve 360 in the axial direction.

The rotor magnet 400 is an annular member having a magnetic pole structure magnetized in a state of the polarities of N and S being alternately reversed along the circumferential direction when viewed in the axial direction. In the present embodiment, the rotor magnet 400 is attached to the inner peripheral surface of the second cylindrical part 393.

The structure of the motor 320 has been described above. Note that the above description is an example of the structure of the motor. Therefore, the structure of the motor is not limited to the above structure, and may be another structure.

Operation of Motor

When the coil 371 is energized, magnetic attractive forces and magnetic repulsion forces generated between the magnetic poles of the rotor magnet 400 and the pole teeth of the stator core 370 are switched. As a result, the rotating part 322 rotates using the shaft 380 as a rotation axis relative to the stationary part 321.

The shaft 380 rotates relative to the bearing sleeve 360. At this time, the lubricating oil is pressurized by the radial dynamic pressure generating grooves 361, and thus dynamic pressure is generated on the lubricating oil. By the generated dynamic pressure, the shaft 380 is supported in a non-contact state in the radial direction and axial direction with respect to the bearing sleeve 360.

The shaft 380 rotates, and thus the rotor hub 390 is rotated relative to the bearing sleeve 360. At this time, the lubricating oil is pressurized by the thrust dynamic pressure generating groove 362, and thus dynamic pressure is generated on the lubricating oil. By the generated dynamic pressure, the rotor hub 390 is supported in a non-contact state in the axial direction with respect to the bearing sleeve 360.

Impeller

The impeller 330 rotates to generate an outward flow of air in the radial direction. The impeller 330 is fixed to the motor 320. The impeller 330 includes a ring part 331 and a plurality of blades 332.

The ring part 331 is a ring-shaped component. The ring part 331 is fixed above the outer edge part 394 of the rotor hub 390 and outside the second cylindrical part 393 in the radial direction by a method such as press-fitting or bonding.

The blades 332 are members extending outward in the radial direction from the ring part 331. The plurality of blades 332 are provided at the ring part 331 at intervals in the circumferential direction.

Operation of Blower

In the blower 300 having the above configuration, when the motor 320 rotates, the impeller 330 rotates. When the impeller 330 rotates, air is sucked in through the suction port 311 and guided to the interior space of the casing 310. The air sucked into the interior space is blown out from the inside toward the outside of the interior space in the radial direction by an action of the plurality of blades 332. Then, the air is blown out from the interior space of the casing 310 to the outside through the blowout port 312.

Effect

The spindle motor 3 or the motor 320 according to the above-described embodiment includes the stator core 50, in the stator core 50, the surface of the stacked body of the electromagnetic steel plates 52 is covered with the coating film 53, and the coating film 53 is an epoxy resin-containing electrodeposition coating film subjected to overbaking.

According to the spindle motor 3 or the motor 320 described above, since the surface of the stator core 50 is covered with the coating film 53 of the epoxy resin-containing electrodeposition coating film subjected to overbaking, the surface of the stator core 50 is covered with the coating film having a hardness higher than a hardness of a coating film not overbaked. Therefore, in a process of winding the coil 51 around the stator core 50, even when pressure is applied to the coil 51, the coil 51 is less likely to be embedded into the coating film 53 of the stator core 50.

In addition, since the coil 51 is less likely to be embedded into the coating film 53 of the stator core 50, a winding defect is less likely to occur in the process of winding the coil 51 around the stator core 50. Therefore, a defect rate in the process of winding the coil 51 around the stator core 50 is improved.

Moreover, in the spindle motor 3 or the motor 320 according to the above-described embodiments, the coating film 53 of the stator core 50 has a pencil hardness of 5H or higher.

A hardness of a coating film not overbaked of a stator core is a pencil hardness of about 3H to 4H. On the other hand, according to the spindle motor 3 or the motor 320 described above, since the hardness of the coating film 53 of the stator core 50 is 5H or higher in terms of pencil hardness, the coil 51 is further unlikely to be embedded into the coating film 53 of the stator core 50 in the process of winding the coil 51 around the stator core 50.

In the spindle motor 3 or the motor 320 according to the above-described embodiment, the coating film 53 of the stator core 50 contains a benzene ring-containing epoxy resin and a pigment containing an aluminum silicate component, and a ratio x of peak intensities calculated by using the following Equation (1) in an absorption spectrum obtained by Fourier transform infrared spectroscopy measurement of the coating film 53 is 0.8 or less.

$$x = I_{polymer}/I_{pigment} \quad (1)$$

According to the spindle motor 3 or the motor 320 described above, in the absorption spectrum obtained by the Fourier transform infrared spectroscopy measurement of the coating film 53 of the stator core 50, the value of the ratio of the peak intensities calculated using Equation (1) is 0.8 or less. Therefore, whether or not the coating film 53 subjected to overbaking has a desired hardness can be inspected by a nondestructive test.

Further, the hard disk drive device 1 according to the present embodiment includes the spindle motor 3 described above.

According to the hard disk drive device 1 described above, since the spindle motor 3 is provided, the defect rate in the process of winding the coil 51 around the stator core 50 is improved. Therefore, a defect rate of the hard disk drive device 1 is also improved.

Furthermore, a magnetic recording system of the hard disk drive device 1 according to the first embodiment is a heat-assisted magnetic recording system.

In the hard disk drive device employing the heat-assisted magnetic recording (HAMR) system, a tip temperature of a magnetic head reaches a high temperature of 400° C. In such a hard disk drive device, it is known to be useful to make oxygen be present in the hard disk drive device in order to decompose organic impurities having a possibility to cause read/write errors.

The present inventors have examined, under an environment of a high temperature of 400° C., in addition to the decomposition of the organic impurities, the possibility that other organic compounds being present in the hard disk drive device may be oxidized to consume oxygen, and as a result, the decomposition of the organic impurities by oxygen becomes insufficient. Thus, the present inventors have focused on coating (the coating film) of the stator core as a candidate for another organic compound consuming oxygen, and have reconsidered the configuration of the coating film on the basis of the idea that the coating film of the stator core consumes no oxygen (avoids taking in oxygen). This has led to a possibility that as an aspect of chemically changing the structure of the coating film, an aspect of the electrodeposition coating film subjected to overbaking may fabricate this idea. In this situation, the present inventors have found that the coating film has a predetermined pencil hardness or more, and that when the coating film is subjected to Fourier transform infrared spectroscopy measurement, a ratio of a peak intensity derived from resin contained in the coating film to a peak intensity derived from a pigment is within a specific range.

According to the hard disk drive device 1 described above, the heat-assisted magnetic recording system is employed as the magnetic recording system, and the coating film 53 of the stator core 50 of the spindle motor 3 is overbaked. Therefore, an amount of oxygen remaining in the hard disk drive device 1 being taken into the coating film 53 is suppressed. As a result, oxygen is likely to remain inside the hard disk drive device 1, and organic impurities remaining inside the hard disk drive device 1 are likely to be decomposed by oxygen.

In addition, the blower 300 according to the second embodiment includes the motor 320.

According to the blower 300 described above, since the motor 320 is provided, the defect rate in the process of winding the coil 371 around the stator core 370 having a structure similar to the structure of the stator core 50 is improved. Therefore, a defect rate of the blower 300 is also improved.

Further, the method for manufacturing the spindle motor 3 or the motor 320 according to the above-described embodiment includes the film-forming and heating of coating the surface of the stacked body of the electromagnetic steel plates 52 with the epoxy resin-containing coating material by electrodeposition coating, heating and curing the epoxy resin-containing coating material by overbaking and forming the coating film 53, and thus manufacturing the stator core 50, and the fixing of fixing the stator core 50 manufactured in the film-forming and heating to the base plate 30 of the spindle motor 3 or the base plate 340 of the motor 320.

In addition, in the method for manufacturing the spindle motor 3 or the motor 320 according to the above-described embodiment, the overbaking in the film-forming and heating is performed at a temperature of 280° C. or higher.

Additionally, the method for manufacturing the spindle motor 3 or the motor 320 according to the above-described embodiment includes the film-forming and first heating of coating the surface of the stacked body of the electromagnetic steel plates 52 with the epoxy resin-containing coating material by electrodeposition coating, heating and curing the epoxy resin-containing coating material by overbaking and forming the coating film 53, the second heating of heating the coating film 53 by overbaking at a temperature higher than the temperature in the first heating and manufacturing the stator core 50, and the fixing of fixing the stator core 50 manufactured in the second heating to the base plate 30 of the spindle motor 3 or the base plate 340 of the motor 320.

Additionally, in the method for manufacturing the spindle motor 3 or the motor 320 according to the above-described embodiment, the overbaking in the second heating is performed at a temperature of 280° C. or higher.

According to the above-described method for manufacturing the spindle motor 3 or the motor 320, the surface of the stator core 50 is coated by the electrodeposition coating of the epoxy resin-containing coating material and then heated and cured by the overbaking to form the coating film 53. Therefore, since the coating film 53 having a hardness increased by the overbaking is formed, it is possible to manufacture the spindle motor 3 or the motor 320 including the coating film 53 of the stator core 50 less likely to be embedded with the coil 51 even when pressure is applied to the coil 51 in the process of winding the coil 51 around the stator core 50.

In addition, since the coil 51 is less likely to be embedded into the coating film 53 of the stator core 50, the winding defect is less likely to occur in the process of winding the coil 51 around the stator core 50, and the defect rate in the manufacturing process of the spindle motor 3 or the motor 320 is improved.

Modifications

Figure 8:
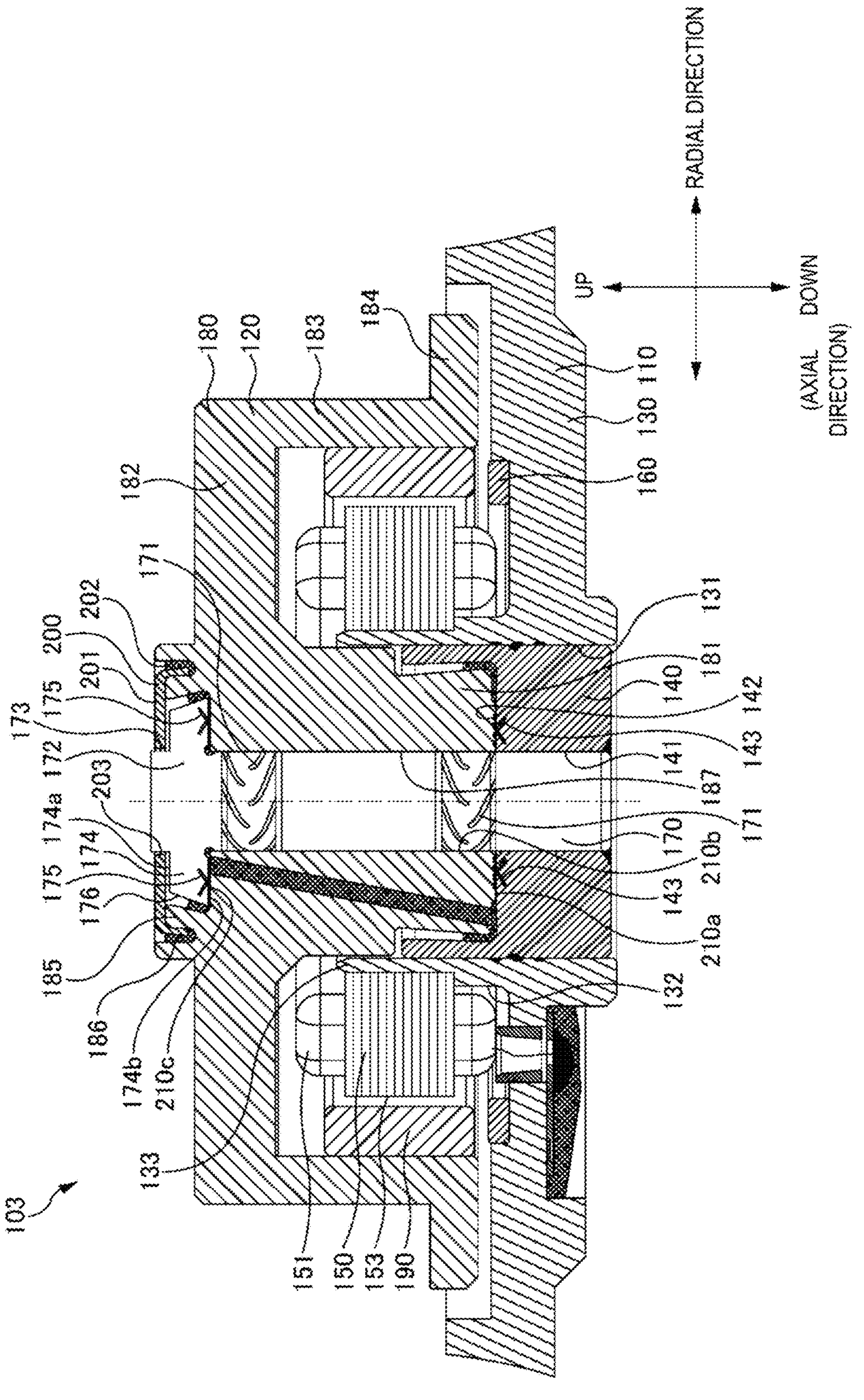
FIG. 8 is a partial cross-sectional view of a spindle motor 103 according to a modification.

It should be noted that the hard disk drive device 1 may include a spindle motor 103 as illustrated in FIG. 8 instead of the spindle motor 3 described in the first embodiment.

Spindle Motor

The spindle motor 103 includes a stationary part 110 and a rotating part 120 rotating relative to the stationary part 110 through a bearing mechanism.

Stationary Part

The stationary part 110 includes a base plate 130, a sleeve 140, a stator core 150, a magnetic attraction plate 160, and a shaft 170.

The base plate 130 is a member made of a metal. The base plate 130 is formed with a through hole 131, a circumferential groove part 132, and a circumferential wall part 133.

The through hole 131 is a hole for fixing the sleeve 140. The through hole 131 is provided so as to penetrate the base plate 130 in the axial direction. The through hole 131 has a tubular shape, and an inner diameter of the tube is approximately equal to or larger than an outer diameter of the sleeve 140.

The circumferential groove part 132 is formed outside the through hole 131 in the radial direction. The circumferential groove part 132 is an annular groove provided so as to be coaxial with a center axis of the through hole 131 when viewed in the axial direction.

The circumferential wall part 133 is formed as an annular wall surface part protruding upward in the axial direction along the through hole 131 from a bottom surface of the circumferential groove part 132 when viewed in the axial direction. The circumferential wall part 133 partitions the through hole 131 and the circumferential groove part 132.

The sleeve 140 fixes the shaft 170 to the base plate 130, and forms a dynamic pressure bearing part together with the rotating part 120. The sleeve 140 is a cylindrical member made of iron, such as stainless steel. The sleeve 140 is inserted into the through hole 131. The sleeve 140 is fixed to the through hole 31 with an adhesive applied to one surface or both surfaces of an outer peripheral surface of the sleeve 140 and an inner peripheral surface of the through hole 131. The sleeve 140 is formed with a sleeve through hole 141 and a sleeve recessed part 142.

The sleeve through hole 141 is provided at a center of the sleeve 140 as viewed in the axial direction and is provided so as to penetrate the sleeve 140 in the axial direction. A diameter of the sleeve through hole 141 is substantially equal to or larger than an outer diameter of the shaft 170.

The sleeve recessed part 142 is a recess formed in a circular shape at the sleeve 140 as viewed in the axial direction. The sleeve recessed part 142 is provided so as to be coaxial with the center axis of the sleeve through hole 141 when viewed in the axial direction. The sleeve recessed part 142 is connected to the sleeve through hole 141 and is formed at an upper side of the sleeve through hole 141. A thrust dynamic pressure generating groove 143 is formed at a bottom surface of the sleeve recessed part 142. The thrust dynamic pressure generating groove 143 is provided in an annular shape as viewed in the axial direction.

The stator core 150 is a member formed by stacking, in the axial direction, a plurality of annular electromagnetic steel plates when viewed in the axial direction. The stator core 150 is disposed and fixed inside the circumferential groove part 132 by a method such as bonding. A surface of the stator core 150 is covered with a coating film 153. The stator core 150 includes a plurality of pole teeth (protruding poles) extending outward in the radial direction and disposed along the circumferential direction. A coil 151 is wound around the pole teeth. When a current flows through the coil 151, the stator core 150 generates a magnetic flux. Note that since the method for manufacturing the stator core 150 is the same as the method for manufacturing the stator core 50 according to the first embodiment, the description of the method for manufacturing the stator core 150 will be omitted.

The magnetic attraction plate 160 is a member configured to stabilize rotation of a rotor hub 180 to be described later. The magnetic attraction plate 160 is made of, for example, a magnetic material. The magnetic attraction plate 160 generates a magnetic flux according to a current supplied to the coil 151. The magnetic attraction plate 160 is disposed at an outer side in the radial direction relative to the stator core 150 at the circumferential groove part 132.

The shaft 170 is a columnar member made of a metal. An outer diameter of the shaft 170 is substantially equal to or smaller than an inner diameter of the sleeve through hole 141. A lower side of the shaft 170 is inserted into the sleeve through hole 141. The shaft 170 is fixed to the sleeve through hole 141 with an adhesive applied to one surface or both surfaces of an outer peripheral surface of the shaft 170 and an inner peripheral surface of the sleeve through hole 141, and is connected to the sleeve 140. The shaft 170 includes radial dynamic pressure generating grooves 171 and a flange part 172.

The radial dynamic pressure generating grooves 171 are provided at a portion of the outer peripheral surface of the shaft 170 inserted into the rotor hub 180 to be described later. In the present modification, the radial dynamic pressure generating grooves 171 are formed at the outer peripheral surface of the shaft 170 in a continuous row in the circumferential direction, and are formed in two rows with an interval in the axial direction.

The flange part 172 is integrally formed with the shaft 170 at the upper end of the shaft 170. The flange part 172 includes a cylindrical part 173, a protruding part 174, and a thrust dynamic pressure generating groove 175.

The cylindrical part 173 is a member having a cylindrical shape coaxial with the center axis of the shaft 170. The cylindrical part 173 is formed at an upper end part of the flange part 172 in the axial direction.

The protruding part 174 is a member having an annular shape coaxial with the center axis of the shaft 170. The protruding part 174 is formed so as to protrude outward in the radial direction from a lower end of the cylindrical part 173. An outer peripheral side surface 176 of the protruding part 174 is inclined in the axial direction. Therefore, when an upper surface **174*a* and a lower surface 174*b* of the protruding part 174 are compared with each other, an outer diameter of the lower surface 174*b* is larger than an outer diameter of the upper surface 174*a***.

The thrust dynamic pressure generating groove 175 is formed at the lower surface **174*b* of the protruding part 174. The thrust dynamic pressure generating groove 175** is provided in an annular shape as viewed in the axial direction.

Rotating Part

The rotating part 120 includes the rotor hub 180, a rotor magnet 190, and an end cap 200.

The rotor hub 180 is a member configured to rotate relative to the sleeve 140 and the shaft 170. The rotor hub 180 is disposed outside the shaft 170, and a lower part is partially disposed at the sleeve recessed part 142. The rotor hub 180 includes an inner cylindrical wall part 181, a disk part 182, an outer cylindrical wall part 183, an outer edge part 184, a standing wall part 185, and an annular groove 186.

The inner cylindrical wall part 181 is a substantially cylindrical member. A gap **210*a* is formed between a lower end surface of the inner cylindrical wall part 181 and the bottom surface of the sleeve recessed part 142 of the sleeve 140. A rotor hub through hole 187 penetrating the rotor hub 180 in the axial direction is formed at a center of the inner cylindrical wall part 181 (a portion corresponding to a rotation center of the rotor hub 180). A diameter of the rotor hub through hole 187 is larger than an outer diameter of the shaft 170. The shaft 170 is inserted into the rotor hub through hole 187. A gap 210*b* is formed between an inner peripheral surface of the rotor hub through hole 187 and an outer peripheral surface of the shaft 170**.

The disk part 182 is a disk-shaped member being coaxial with the center of the inner cylindrical wall part 181 when viewed in the axial direction. The disk part 182 is formed outward in the radial direction from an upper end side of the inner cylindrical wall part 181.

The outer cylindrical wall part 183 is a cylindrical member having a thickness in the radial direction. The outer cylindrical wall part 183 is provided so as to be coaxial with the center of the inner cylindrical wall part 181 when viewed in the axial direction, and protrudes downward in the axial direction. The outer cylindrical wall part 183 is provided at an outer edge of the disk part 182.

The outer edge part 184 is an annular member. The outer edge part 184 is provided at a lower end of the outer cylindrical wall part 183. The outer edge part 184 protrudes outward in the radial direction from the outer cylindrical wall part 183 and is formed in a flange shape. The plurality of recording disks 4 are installed above the outer edge part 184 and outside the outer cylindrical wall part 183 in the radial direction (see FIG. 1).

The standing wall part 185 is an annular member. The standing wall part 185 is provided at an outer side in the radial direction relative to the rotor hub through hole 187 at an upper surface of the disk part 182, and protrudes upward in the axial direction. The flange part 172 is accommodated in a space inside the standing wall part 185 in the radial direction. A gap 210*c* is formed between the upper surface of the disk part 182 at the inner side in the radial direction relative to the standing wall part 185 and the lower surface 174*b* of the protruding part 174.

The annular groove 186 is used for positioning and fixing the end cap 200. The annular groove 186 is provided at the outer side in the radial direction relative to the standing wall part 185 at the upper surface of the disk part 182.

The rotor magnet 190 is an annular member having a magnetic pole structure magnetized in a state of the polarities of N and S being alternately reversed along the circumferential direction when viewed in the axial direction. The rotor magnet 190 is attached to an inner peripheral surface of the outer cylindrical wall part 183. The rotor magnet 190 is at approximately the same position as the stator core 150 in the axial direction, and is at approximately the same position as the magnetic attraction plate 160 in the radial direction.

The end cap 200 prevents leakage of a lubricating oil used in the dynamic pressure bearing part. The end cap 200 is a substantially cylindrical member. The end cap 200 includes a top plate part 201 and a side wall part 202.

The top plate part 201 is a circular member. An end cap through hole 203 is formed at a center of the top plate part 201. The cylindrical part 173 of the flange part 172 is inserted into the end cap through hole 203. An inner peripheral surface of the end cap through hole 203 is disposed so as to be closely opposed to the outer peripheral surface of the cylindrical part 173.

The side wall part 202 is an annular member. The side wall part 202 is provided so as to be coaxial with the center of the top plate part 201 as viewed in the axial direction, and protrudes downward in the axial direction. The side wall part 202 is provided at an outer edge of the top plate part 201. The side wall part 202 is accommodated in the annular groove 186 in a state of fitting the inner peripheral surface to the standing wall part 185. The end cap 200 is fixed to the rotor hub 180 by fixing the side wall part 202 to the standing wall part 185 or the annular groove 186 by a method such as bonding or welding.

A lubricating oil is filled between the rotor hub 180 and the sleeve 140, and between the rotor hub 180 and the shaft 170. To be specific, the gaps 210*a*, 210*b*, and 210*c* are filled with the lubricating oil.

Operation of Spindle Motor

When the coil 151 is energized, magnetic attractive forces and magnetic repulsion forces generated between the magnetic poles of the rotor magnet 190 and the pole teeth of the stator core 150 are switched. As a result, the rotating part 120 rotates, with the shaft 170 serving as a center, relative to the stationary part 110.

The rotor hub 180 rotates relative to the shaft 170. At this time, the lubricating oil is pressurized by the radial dynamic pressure generating grooves 171 and the thrust dynamic pressure generating groove 175, and thus a dynamic pressure is generated on the lubricating oil. The rotor hub 180 is supported in a non-contact state in the radial direction with respect to the shaft 170 by the dynamic pressure generated by the radial dynamic pressure generating grooves 171. Further, the rotor hub 180 is supported in a non-contact state in the axial direction with respect to the shaft 170 by the dynamic pressure generated by the thrust dynamic pressure generating groove 175.

The rotor hub 180 rotates relative to the sleeve 140. At this time, the lubricating oil is pressurized by the thrust dynamic pressure generating groove 143, and thus the dynamic pressure is generated on the lubricating oil. By the dynamic pressure generated by the thrust dynamic pressure generating groove 143, the rotor hub 180 is supported in a non-contact state in the axial direction with respect to the sleeve 140.

The structure of the spindle motor 103 according to the modification has been described above. Note that the above description is an example of the structure of the motor. Therefore, the structure of the motor is not limited to the above structure, and may be another structure.

Evaluation of Coating Film

The stacked body of the electromagnetic steel plates 52 was subjected to electrodeposition coating with a coating material containing an epoxy resin and an aluminum silicate component, and was heated and cured to obtain the coating film 53. The coating film 53 was overbaked by heating at a heating temperature of 280° C. for 60 minutes.

Fourier Transform Infrared Spectroscopy (FTIR) Measurement

Figure 9A:
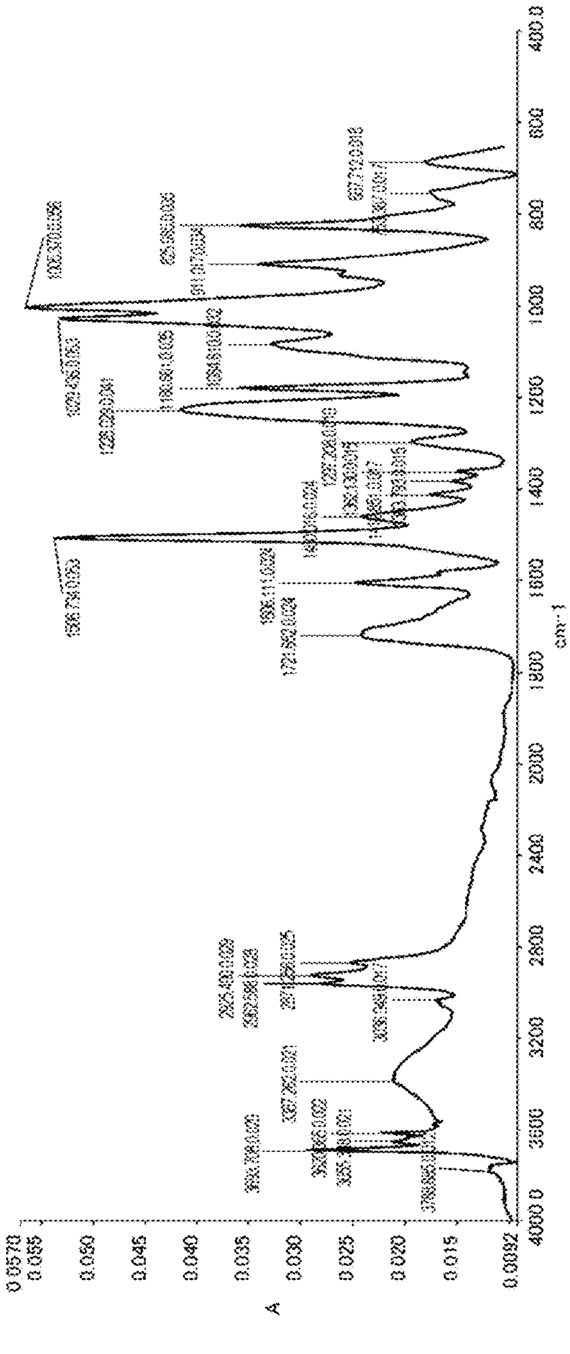
FIG. 9A and FIG. 9B are diagrams illustrating absorption spectra of a coating film of a stator core measured by Fourier transform infrared spectroscopy.
Figure 9B:
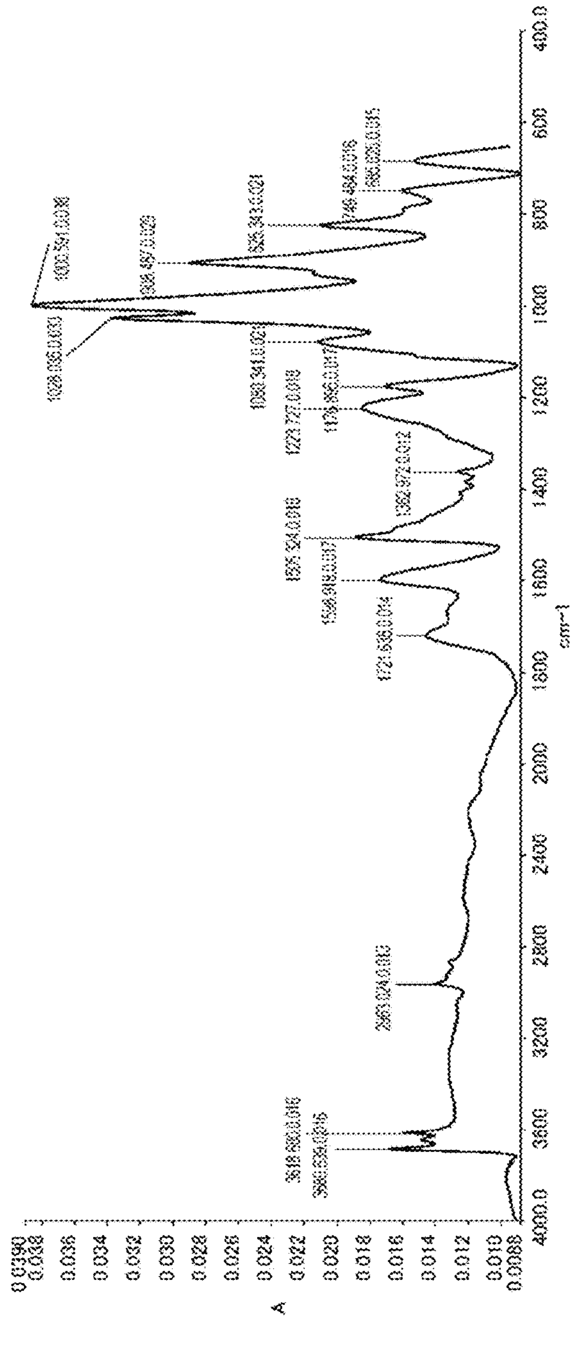

For each of the coating films 53 before and after the overbaking, an IR absorption spectrum of the coating film 53 was directly measured by the ATR method using a diamond crystal. The obtained absorption spectra are illustrated in FIG. 9A and FIG. 9B. FIG. 9A illustrates the absorption spectrum before the overbaking, and FIG. 9B illustrates the absorption spectrum after the overbaking.

In FIG. 9A and FIG. 9B, a peak at wave numbers 1490 $cm^{-1}$ to 1520 $cm^{-1}$ can be identified as a peak derived from the epoxy resin, and a peak at wave numbers 995 $cm^{-1}$ to 1010 $cm^{-1}$ can be identified as a peak derived from the pigment. As illustrated in FIG. 9A and FIG. 9B, according to comparison between an absorption spectrum before the overbaking (FIG. 9A) and an absorption spectrum after the overbaking (FIG. 9B), the peak intensity derived from the epoxy resin can be confirmed to be significantly reduced compared with the peak intensity derived from the pigment. Here, when the ratio of the peak intensities before the overbaking and the ratio of the peak intensities after the overbaking ($x=I_{polymer}/I_{pigment}$) was calculated by using the peak intensity derived from the epoxy resin and the peak intensity derived from the pigment, x was 0.90 before the overbaking and x was 0.41 after the overbaking.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A motor comprising:

a stator core including a stacked body of electromagnetic steel plates, a surface of the stacked body being covered with a coating film, wherein the coating film is an epoxy resin-containing electrodeposition coating film subjected to overbaking, wherein the coating film contains a benzene ring-containing epoxy resin and a pigment containing an aluminum silicate component, and a value of a ratio x of peak intensities calculated by using Equation (1) below is 0.8 or less in an absorption spectrum obtained by Fourier transform infrared spectroscopy measurement of the coating film, $$x = I_{polymer} / I_{pigment} \quad (1),$$

where $I_{polymer}$ represents a value of peak intensity at a wave number corresponding to an absorbance derived from the benzene ring, and $I_{pigment}$ represents a value of peak intensity at a wave number corresponding to an absorbance derived from the pigment containing the aluminum silicate component.

2. The motor according to claim 1, wherein the coating film has a pencil hardness of 5H or higher.

3. A hard disk drive device comprising:

the motor according to claim 1.

4. The hard disk drive device according to claim 3, wherein a magnetic recording system of the hard disk drive device is a heat-assisted magnetic recording system.

5. A blower comprising:

the motor according to claim 1.

* * * * *